United States Patent
Kunkel et al.

(10) Patent No.: US 11,252,401 B2
(45) Date of Patent: Feb. 15, 2022

(54) OPTICALLY COMMUNICATING DISPLAY METADATA

(71) Applicant: Dolby Laboratories Licensing Corporation, San Francisco, CA (US)

(72) Inventors: Timo Kunkel, Kensington, CA (US); Robin Atkins, San Jose, CA (US); Tao Chen, Palo Alto, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 189 days.

(21) Appl. No.: 16/053,643

(22) Filed: Aug. 2, 2018

(65) Prior Publication Data

US 2019/0045181 A1 Feb. 7, 2019

Related U.S. Application Data

(60) Provisional application No. 62/542,146, filed on Aug. 7, 2017.

(51) Int. Cl.
*H04N 17/02* (2006.01)
*H04N 9/64* (2006.01)
*G06K 19/06* (2006.01)
*G06K 7/14* (2006.01)
*G06T 7/90* (2017.01)

(52) U.S. Cl.
CPC ........... *H04N 17/02* (2013.01); *G06K 7/1417* (2013.01); *G06K 19/06037* (2013.01); *G06T 7/90* (2017.01); *H04N 9/64* (2013.01)

(58) Field of Classification Search
CPC . H04N 17/02; H04N 9/64; G06T 7/90; G06K 19/06037

USPC .......................................................... 348/182
See application file for complete search history.

(56) References Cited

U.S. PATENT DOCUMENTS

| 8,743,291 | B2* | 6/2014 | Li | G06T 5/009 348/708 |
| 9,077,994 | B2 | 7/2015 | Miller | |
| 10,277,783 | B2* | 4/2019 | Min | H04N 5/93 |

(Continued)

FOREIGN PATENT DOCUMENTS

| EP | 3051823 | 8/2016 |
| EP | 3059937 | 8/2016 |

(Continued)

OTHER PUBLICATIONS

Edouard, Francois et al "High Dynamic Range and Wide Color Gamut Video Coding in HEVC: Status and Potential Future Enhancements", IEEE Transactions on Circuits and Systems for Video Technology vol. 26, Issue: 1, Jan. 2016, pp. 63-75.

(Continued)

*Primary Examiner* — John W Miller
*Assistant Examiner* — Omer Khalid

(57) ABSTRACT

In some embodiments, a display device is disclosed to optically communicating display parameters. The device receives input image data. Embedded in the input image data is a code value identifying a request for a portion of a display parameter of the display device. The device decodes the embedded code value. The device generates an optical image based on the request and transmits the generated optical image to an output of the display device to communicate the requested portion of the requested display parameter.

20 Claims, 9 Drawing Sheets

(56) References Cited

U.S. PATENT DOCUMENTS

| | | | |
|---|---|---|---|
| 2006/0290701 A1* | 12/2006 | Masaki | G09G 3/006 345/520 |
| 2012/0054664 A1 | 3/2012 | Dougall | |
| 2012/0319942 A1* | 12/2012 | Kim | H04N 21/436 345/156 |
| 2014/0055675 A1* | 2/2014 | An | H04N 21/43615 348/569 |
| 2014/0363093 A1* | 12/2014 | Miller | H04N 19/40 382/235 |
| 2015/0117791 A1 | 4/2015 | Mertens | |
| 2016/0005153 A1 | 1/2016 | Atkins | |
| 2016/0057454 A1 | 2/2016 | Bordes | |
| 2016/0080716 A1 | 3/2016 | Atkins | |
| 2016/0203618 A1* | 7/2016 | Li | G06T 11/001 345/591 |
| 2016/0241829 A1* | 8/2016 | Qu | H04N 7/0806 |
| 2016/0248939 A1 | 8/2016 | Thurston, III | |
| 2016/0309154 A1* | 10/2016 | Rusanovskyy | H04N 19/159 |
| 2017/0150220 A1* | 5/2017 | Greene | H04N 21/4147 |

FOREIGN PATENT DOCUMENTS

| | | |
|---|---|---|
| EP | 3096516 | 11/2016 |
| EP | 3097688 | 11/2016 |
| WO | 2014/0160705 | 10/2014 |
| WO | 2016/0091406 | 6/2016 |
| WO | 2016/0118395 | 7/2016 |

OTHER PUBLICATIONS

Rafal, Mantiuk et al. "Backward Compatible High Dynamic Range MPEG Video Compression", ACM, 2006, Proceedings of SIGGRAPH'06 (Special issue of ACM Transactions on Graphics, pp. 1-11.

Froehlich, Jan et al. "Encoding Color Difference Signals for High Dynamic Range and Wide Gamut Imagery", Oct. 1, 2015, Society for Imaging Science and Technology, pp. 240-247.

Ebner, F. et al "Development and Testing of a Color Space (IPT) with Improved Hue Uniformity" Proc. 6th Color Imaging Conference: Color Science, Systems, and Applications, IS&T, Scottsdale, Arizon, Nov. 1998, pp. 8-13.

SMPTE ST2084:2014 High Dynamic Range Electro-Optical Transfer Function of Mastering References Displays, Aug. 16, 2014.

ITU-R REC BT.2100-0 "Image Parameter Values for High Dynamic Range Television for Use in Production and International Programme Exchange" Jul. 2016.

* cited by examiner

| Request Type Mapping Table | |
|---|---|
| Name | Value |
| 0 | No optical communication (e.g., image content is displayed) |
| 1 | DM Major Version |
| 2 | DM Minor Version |
| 3 | Panel Technology |
| 4 | Measurement Patch Size |
| 5-254 | ... |
| 255 | Display All Colors Used for Communication |

| Value Mapping Table | |
|---|---|
| Name | Value |
| 0 | Datatype (uint4) |
| 1 | Payload Hex 1 (4 bits) |
| 2 | Payload Hex 2 (4 bits) |
| 3 | Payload Hex 3 (4 bits) |
| 4 | Payload Hex 4 (4 bits) |
| 5 | Payload Hex 5 (4 bits) |
| 6-254 | Additional 4 Bit Data Packets |
| 255 | Checksum |

Color Mapping Table

| ID | R | G | B | x | y | Y |
|---|---|---|---|---|---|---|
| 0 | 0 | 0 | 128 | 0.2266 | 0.1764 | 0.1551 |
| 1 | 0 | 255 | 255 | 0.7152 | 0.3000 | 0.6000 |
| 2 | 0 | 255 | 128 | 0.7308 | 0.2732 | 0.5034 |
| 3 | 0 | 255 | 255 | 0.7874 | 0.2247 | 0.3287 |
| 4 | 128 | 128 | 255 | 0.2725 | 0.2168 | 0.1703 |
| 5 | 128 | 255 | 0 | 0.7611 | 0.3355 | 0.5718 |
| 6 | 128 | 255 | 128 | 0.7767 | 0.3052 | 0.4882 |
| 7 | 128 | 255 | 255 | 0.8333 | 0.2475 | 0.3288 |
| 8 | 255 | 0 | 128 | 0.2282 | 0.4993 | 0.2524 |
| 9 | 255 | 0 | 255 | 0.2848 | 0.3209 | 0.1542 |
| 10 | 255 | 255 | 0 | 0.3670 | 0.5430 | 0.4070 |
| 11 | 255 | 128 | 128 | 0.3826 | 0.4551 | 0.3294 |
| 12 | 255 | 128 | 255 | 0.4392 | 0.3184 | 0.2087 |
| 13 | 255 | 255 | 0 | 0.9278 | 0.4193 | 0.5053 |
| 14 | 255 | 255 | 128 | 0.9434 | 0.3860 | 0.4501 |
| 15 | 255 | 255 | 255 | 1.0000 | 0.3127 | 0.3290 |

OPTICALLY COMMUNICATING DISPLAY METADATA

CROSS-REFERENCE TO RELATED APPLICATIONS

This application claims the benefit of priority from U.S. Application No. 62/542,146 filed Aug. 7, 2017, which is hereby incorporated by reference in its entirety.

BACKGROUND

When characterizing and/or debugging third-party display devices, such as television (TV) units and setup boxes with a Dolby display management system, it is necessary for a user to make an assessment of the display device and/or enter information manually. Sometimes this might be difficult if the user does not have adequate information about display parameters of the display management system, such as the firmware version. The difficulties increase when there is a mismatch in firmware versions between two TVs of the same TV model due to different geographic markets or retail strategies (e.g., online versus retail). Sometimes the same TV can be sold under different names.

This difficulty in characterization and/or debugging could be resolved if the display devices could communicate its parameters with a third party measurement system. However, display manufacturers are reluctant to allow communication between their display devices and third-party equipment to avoid a breach of the device's firmware firewall or to simply avoid costs related to implementation of such communication. Accordingly, during characterizing and/or debugging, manual assessment of display information is required—which may be cumbersome and error prone.

BRIEF DESCRIPTION OF THE DRAWINGS

The present invention is illustrated by way of example and not limitation in the figures of the accompanying drawings in which like references indicate similar elements.

FIG. 3 shows an example of a request type mapping table (e.g., L255.metadata.type) according to one embodiment.

FIG. 4 shows an example of a value mapping table (e.g., L255.metadata.value) (optional) according to one embodiment.

DESCRIPTION OF EXAMPLE EMBODIMENTS

Figure 1A:
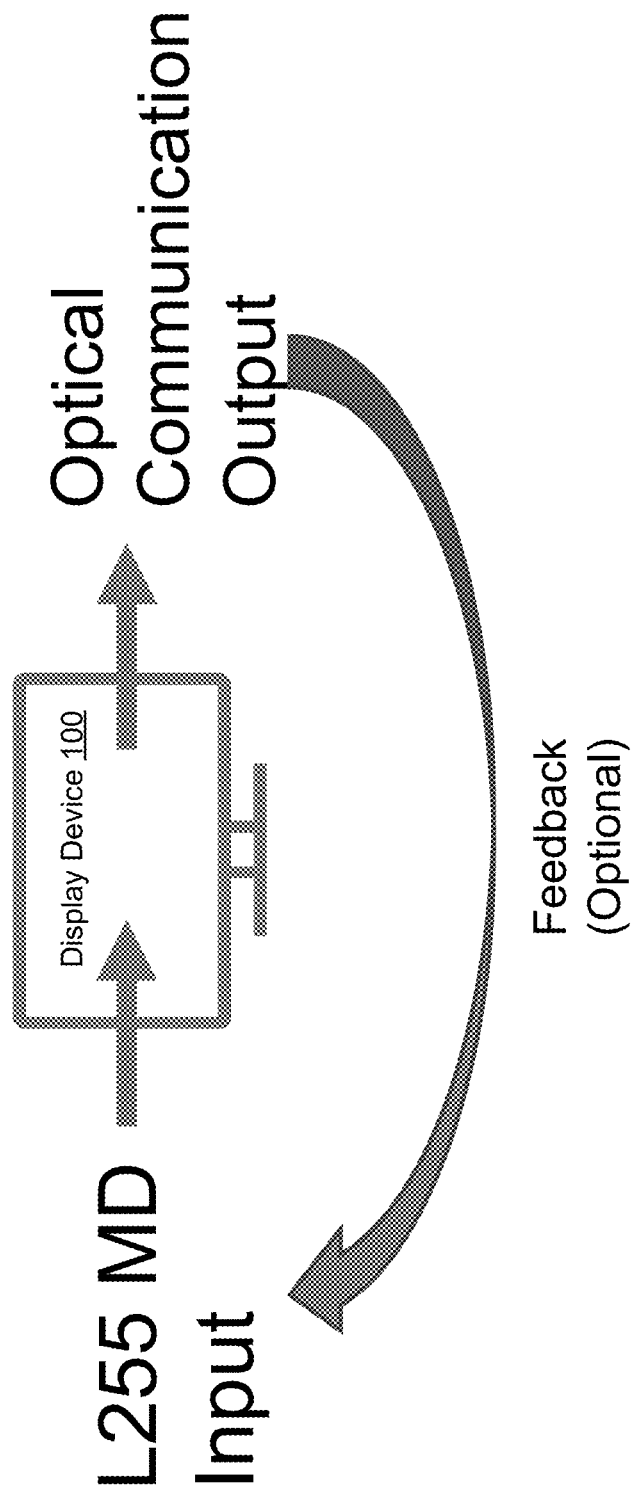
FIG. 1A shows an overview of an optical communication of a display device according to one embodiment.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Dolby Vision technology refers an end-to-end production process, from the content creation right to rendering an image on a display device. A metadata in each frame, in one embodiment, dictates how an image is to be displayed on compatible display devices and this metadata can be used in the Dolby display management system to provide good results on many different compatible display devices that can have different capabilities and specifications. Typically, the compatible display devices include additional visual quality enhancements like higher dynamic range (HDR) and wide color gamut (WCG).

According to some embodiments, methods and devices for optically communicating display parameters (e.g., firmware version, display management version) of a display device is disclosed. In one embodiment, a display device receives a request code or metadata identifier scrambled in an image signal. In another embodiment, the display device receives the request code or metadata identifier separate from the image signal. The device decodes the code identifier to correspond to a request for a display parameter of the display device or a portion thereof. The device generates an optical image based on the request and transmits the generated optical image to an output port of the display device to communicate the portion of the display parameter. In one embodiment, the display device is equipped with Dolby Vision technology or a display management system that renders visual quality enhancements to output image frames. In another embodiment, the display device is fitted with a security module (e.g., a firewall) that prevents direct access to data from the display management system or the display device (e.g., the firewall prevents access, through electrical signals, to version numbers or other data about components of the display management system or the display devices). A display management system is a system with an image processing pipeline that manipulates image data before rendering the data to a display output. The image manipulation may include a series of non-linear and/or linear transformations and conversions between different color spaces.

Figure 1B:
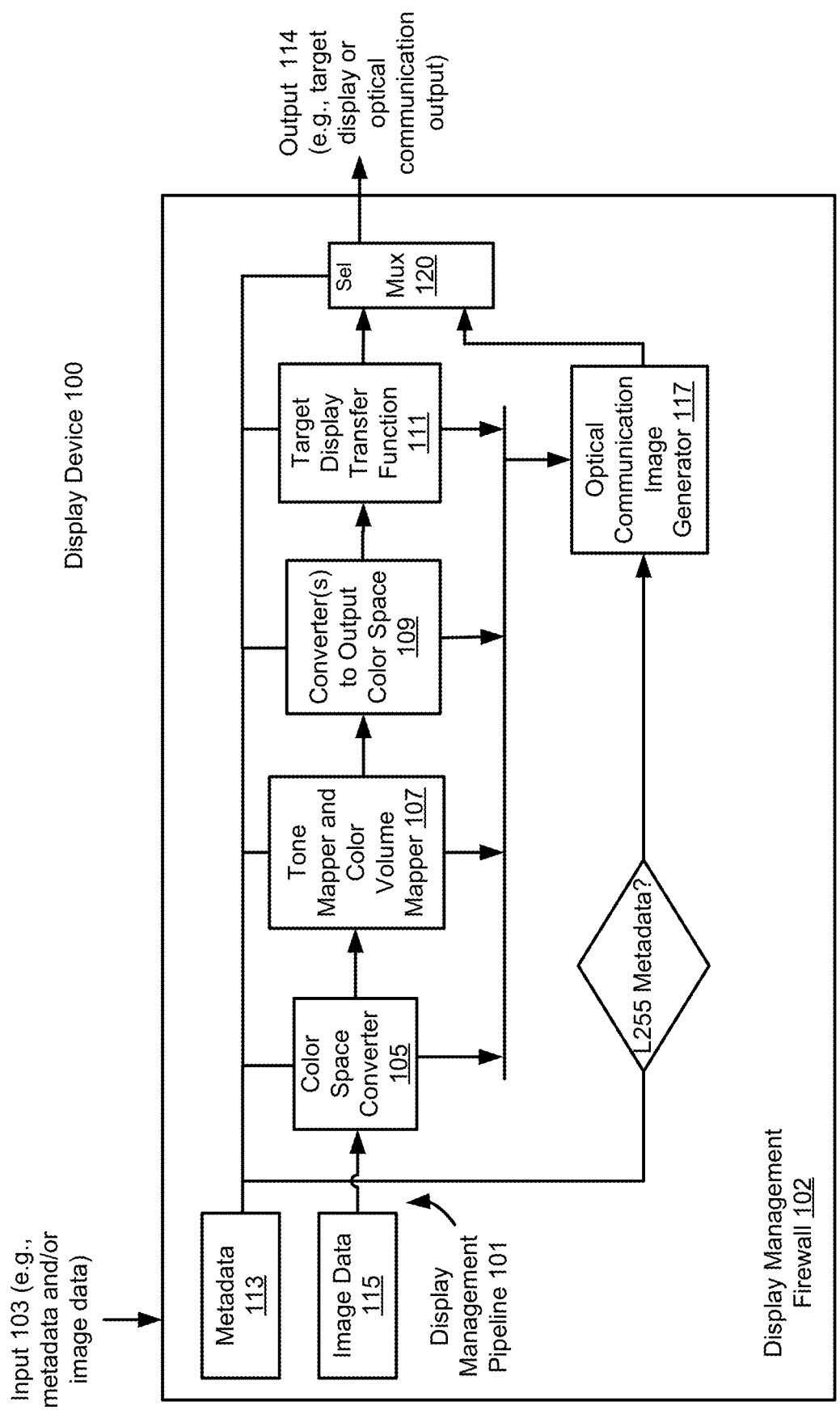
FIG. 1B shows a block diagram of an optical communication of a display device according to one embodiment.

FIG. 1A shows an overview of an optical communication of a display device according to one embodiment. FIG. 1B shows a block diagram of an optical communication of a display device according to one embodiment. Referring to FIG. 1A, display device 100 optically communicates display parameters, in one embodiment, based on a request code embedded in a set of metadata (shown as a level 255 metadata) of input image data. For example, referring to FIG. 1B, display device 100 may receive input 103. Input 103 can include video image frames or image data 115 and embedded metadata 113. Image data 115 may be video image frames to be rendered at a display screen of display device 100. The display device determines a request code (also referred to as a code value) from embedded metadata 113 and decodes the request code based on one or more mapping table(s), such as request type mapping table of FIG. 3. The display device retrieves the requested display parameter values and generates an optical image based on the requested parameter value. The optical image is generated based on an output color mapping table, such as color mapping table of FIG. 5A. The display device in one embodiment (e.g., the 'display device' is a set top box that drives a separate display) can transmit the generated optical image to an output port of the display device and the display receives the generated optical image from the output port. The display device can in another embodiment display the generated optical image on a display screen. In one embodiment, the generated optical image includes a single region of color representing a 4-bit word of 4-bit (e.g., 16) colors or other bit depths. In another embodiment, the generated optical image includes multiple regions of color, each representing a 4-bit word of 4-bit (e.g., 16) colors. The output images may be measured by a spot measurement device calibrated to receive colors of the colors set for the display device. In another embodiment, a subsequent level 255 metadata may be generated for a subsequent optical communication to the display device based on a measurement value of the spot measurement device to form a closed feedback loop. In some embodiments, single or multiple regions of colors can be represented by varying bit lengths, so long as the colors displayed can be measured by an image capturing device or a spot measuring device and the colors can be decoded by a measurement system. For example, a particular optical image may include a first color region to represent a 5-bit code value and a second color region simultaneously to represent a 3-bit code value.

Referring to FIG. 1B, in one embodiment, a display device 100 includes a display management pipeline 101. The display management pipeline 101 includes a security module or firewall 102 that prevents conventional access (such as electrical read out) to data from at least the display management pipeline for various security reasons, such as a prevention of a security breach or potential hacking of either the display management system or the display device. The display management pipeline 101 receives input 103. Input 103 can include image data 115 and embedded metadata 113. Image data 115 can represent one or more images in a general intermediate color space provided as an input to color space converter or converter 105. Converter 105 may use a linear or non-linear transformation to convert image data in a general intermediate color space to image data in another color space, such as a RGB-type color space to an IPT-type color space. RGB color space refers to an additive color space based on the three chromaticities of the red, green, and blue additive primaries. As used herein "IPT color space" refers to a Luma (I)-Chroma (P and T)-like space (like YCbCr). The original IPT space was described in "Development and testing of a color space (ipt) with improved hue uniformity", by F. Ebner and M. D. Fairchild, in Proc. 6th Color Imaging Conference: Color Science, Systems, and Applications, IS&T, Scottsdale, Ariz., November 1998, pp. 8-13 (to be referred to as the Ebner paper), which is incorporated herein by reference in its entirety. More recently, the final non-linearity in the Ebner paper was replaced by a perceptual quantizer (PQ) that better matches the properties of the human visual system. The PQ quantizer is described in U.S. Pat. No. 9,077,994, by J. S. Miller et al., which is incorporated herein by reference in its entirety, parts of which have been adopted by the SMPTE ST 2084:2014 specification, titled "High Dynamic Range Electro-optical Transfer Function of Mastering Reference Displays," Aug. 16, 2014, incorporated herein by reference in its entirety. In certain embodiments, IPT may refer to the ICtCp color space defined in the ITU-R Rec. BT. 2100-0 (July 2016), "Image parameter values for high dynamic range television for use in production and international programme exchange," which is incorporated herein by reference in its entirety. Like YCbCr, ICtCp is a color-opponent based encoding scheme intended to separate luma from chroma information. In addition, ICtCp offers constant intensity (CI) representation.

The converted image data is then mapped in tone mapper and color volume mapper or mapper 107. The tone mapper, in one embodiment, in mapper 107 can map intensity (or luminance like) values, such as the I values in image data from converter 105 in the IPT-type color spaces, in the input image data (which can have the high dynamic range of the source display) to intensity (or luminance like) values in the dynamic range of the target display (which may be a smaller dynamic range relative to the source display). The color volume mapper in mapper 107 can, in one embodiment, perform color volume mapping from the input image data (which can have the wide color gamut of the source display) to image data in the color gamut of the target display 114. The output from the mapper 107 can be provided as an input to one or more color space converters 109 which convert the mapped image data to the output space of the target display 114; the output from the one or more color space converters 109 is transformed by target display transfer function 111 to derive an output that drives the target display 114.

Metadata 113 (e.g., a level 255 metadata) may be embedded in image data 115 or may be received as a separate data source. Metadata 113 includes a request code or identifier value or code value representing display parameter requests. Optical communication image generator 117 receives metadata 113 and determines if metadata 113 is a level 255 metadata. If metadata 113 is a level 255 metadata, metadata 113 decodes metadata 113 to correspond to a request for a portion of a display parameter of the display device. The decoding process may be performed based on a request type mapping table (e.g., codes are predefined to correspond to a particular request), such as table 300 of FIG. 3. The requested display parameter may be any display parameters, e.g., display parameters of any modules of display management pipeline 101 (converter 105, mapper 107, converter(s) 109, display transfer function 111), or a display management/firmware version number or parameters of the display device. Optical communication image generator 117 generates an image based on the request and transmits the generated optical image to output 114 through, in one embodiment, multiplexer 120. The image may be generated based on a color mapping table, such as color mapping table of FIG. 5A. In one embodiment, output 114 includes a switching mechanism such as multiplexer 120 to switch between an output of target display transfer function 111 and optical communication image generator 117. When metadata 113 is present (or metadata 113 selects a particular display mode), multiplexer 120 selects output images from generator 117 instead of images from transfer function 111. In another embodiment, metadata 113 includes a sequence of request codes, such as a comma delimited sequence. In another embodiment, generator 117 generates a sequence of one or more optical images to be transmitted to output 114.

Figure 2:
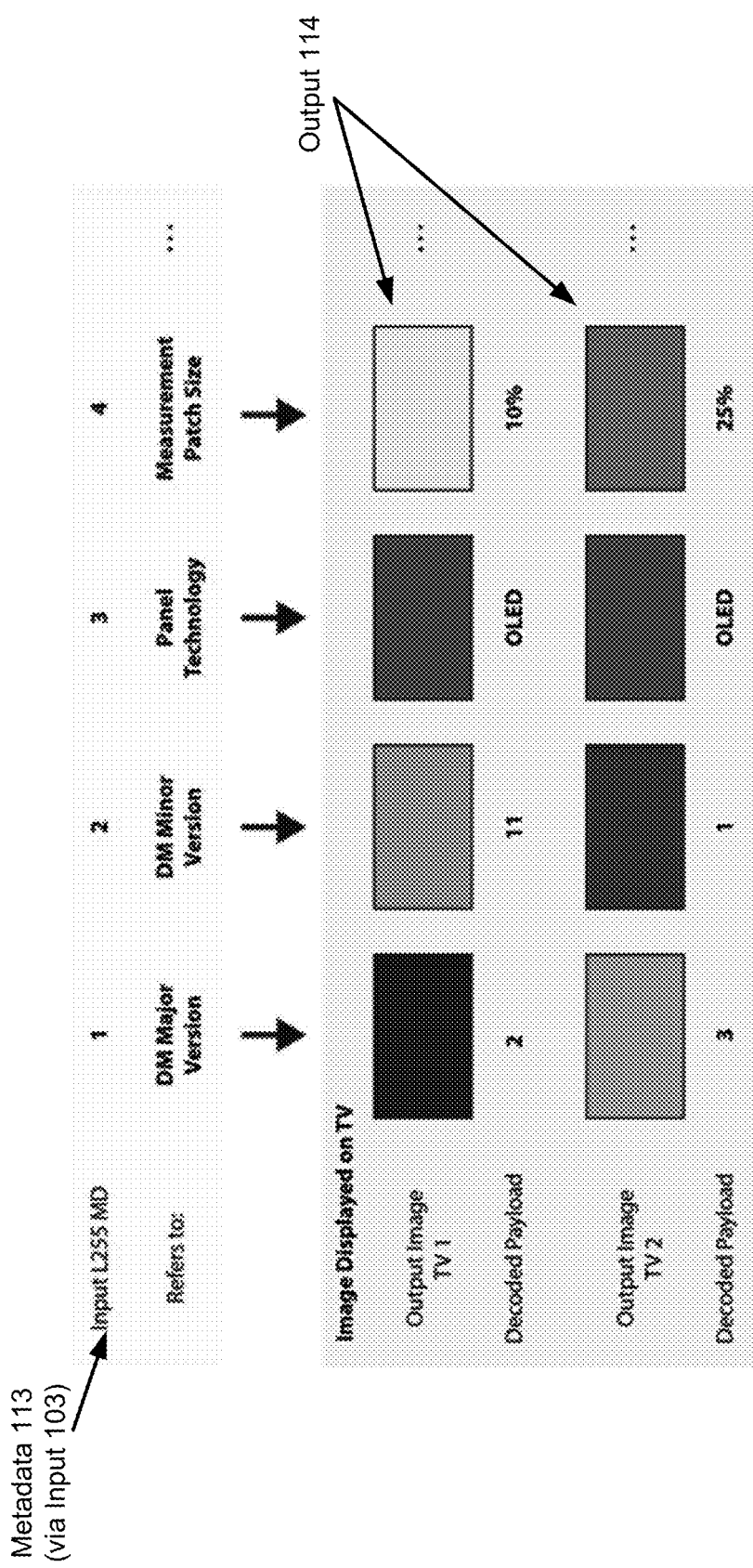
FIG. 2 shows examples of metadata code values (e.g., L255.metadata.type) and corresponding output display images according to one embodiment.

FIG. 2 shows examples of metadata code values (e.g., L255.Metadata.type) and corresponding output display images for two different display devices (e.g., TV1 and TV2) according to one embodiment. Referring to FIG. 2, input L255 MD may correspond to input metadata 113. Metadata 113, or a L255 MD type having values of 1, 2, 3, and 4 may correspond to a request for display parameters of display management (DM) major version, DM minor version, panel technology, and measurement patch size, respectively. Upon receiving and decoding these exemplary code values, display devices, such as TV1 and TV2 would generate output payloads correspondingly. For example, as shown in FIG. 2, upon receiving a L255 MD Type having values of 1, 2, 3, and 4, TV1 outputs single color images dark blue, orange, dark cyan, and light green corresponding to output payloads 2, 11, OLED, 10%, respectively. Upon receiving a L255 MD Type having values of 1, 2, 3, and 4, TV2 outputs single color images green, blue, dark cyan, and magenta corresponding to output payloads 3, 1, OLED, 25%, respectively. The output color may be representative of a 4-bit code word based on a 16-color set predefined in a color mapping table, such as the color mapping table of FIG. 5. In another embodiment, an output image may include multiple regions, each region consisting of a single color representing a 4-bit output value. For example, images with four rectangular regions or four horizontal/vertical stripes (or any multiples of two) may represent four consecutive output payloads, thus, effectively communicate more information (e.g., display parameters of the system) per image. In another embodiment, spot measurement devices can be adapted to decode multiple regions/stripes. In another embodiment, generator 117 of FIG. 1B may generate images having a spatial pattern (e.g., a barcode, or a QR code) to represent one or more display parameters of the display device. In another embodiment, a corresponding measurement device such as an image capturing device (e.g., a smart phone or other mobile device) is adapted to capture and interpret a generated spatial pattern such as a barcode or a generated QR code. In another embodiment, a subset of code values, or a pattern thereof, may be reserved for status updates. For example, if a user updates a setting of the display device, sending a reserved code value triggers the display device to acknowledge and/or report the most recent settings update. In one embodiment, the optical output from the display device can be captured by a camera on a user's mobile device (e.g., a smart phone) when the user, who operates the display devices, seeks information about the display device.

FIG. 3 shows an example of a request type mapping table 300 (e.g., L255 metadata.type) according to one embodiment. Table 300 may be a name value pair mapping identifier (ID) codes to display parameters. In one embodiment, table 300 is used by an optical communication image generator such as generator 117 of FIG. 1B to decode a request code or code value, such as a request code embedded in metadata 113 of FIG. 1B and to select the appropriate output specified in the table. For example, in one embodiment, display device 100 may receive input 103 having metadata 113 with a code value of 1. Generator 117 decodes and determines that request code value 1 corresponds to a request for a display manager major version based on mapping table 300. Generator 117 retrieves the display management major version from display device 100 and encodes it in optical images (e.g., selects and renders a color) and transmits the optical image to output 114.

FIG. 4 shows an example of a value mapping table 400 (e.g., L255.metadata.value) (optional) according to one embodiment. Similar to table 300, table 400 may be a name value pair mapping identifier codes to correspond to the nth 4-bit word of the output payload, e.g., table 400 or L255.metadata.value is a reference to the nth 4-bit word of the output payload. In one embodiment, metadata 113 includes L255.metadata.value=n where n is the nth 4-bit word of the requested display parameter. In another embodiment, L255.metadata.value is not set and the display device uses a default value, e.g., display only a first 4-bit data word or a single image output payload. Generally, the L255.metadata.value is set based on the number of 4-bit words for a requested display parameter.

In one example, a request code may ask the display device to return a major display management version. In this scenario, L255.metadata.value may not be set and the display device simply output a single color image, e.g., a 4-bit value representing the major version. In another example, request code(s) may ask the display device for a minor firmware version. In this scenario, if the firmware minor version is 16 bits in length. The display device will receive four requests requesting a first, a second, a third, and a fourth 4-bit word of the 16 bit firmware version, frame by frame. E.g., Input request includes L255.metadata.type=identifier code for "firmware minor version", and L255.metadata.value=0 to 3 to correspond to the first, second, third, and fourth 4-bit word representation of the 16-bit firmware minor version. Output will display four separate optical images in communicating the 16 bits, frame by frame.

In another example, display device 100 may receive input 103 having L255.metadata.type=255 and L255.metadata.value=0 to 15, in 16 frames, frame by frame. Generator 117 decodes and determines that the request code type and value correspond to the 16 measurement colors (typically for calibration purposes). Generator 117 generates the measurement color images and output the measurement color images to output 114. Output 114 may display the generated optical images, frame by frame.

In another example, a request code may request for a RGB to YUV conversion matrix of the display device. The RGB to YUV (a color space) conversion matrix is typically a 3×3 matrix of 32-bit float values. In a sequence of frames, the L255.metadata.value may be set from 0 to 71 corresponding to eight 4-bit words of nine coefficients of the 3×3 matrix, e.g., a total of 72 output images. In this scenario, a measurement device will receive 72 separate optical images in communicating the 3×3 conversion matrix of float values.

In another embodiment, display device may display an optical image or a 4-bit checksum value (e.g., L255.metadata.type=255). A checksum value is typically for error correction or error checking purposes.

Figures 5A, 5B:
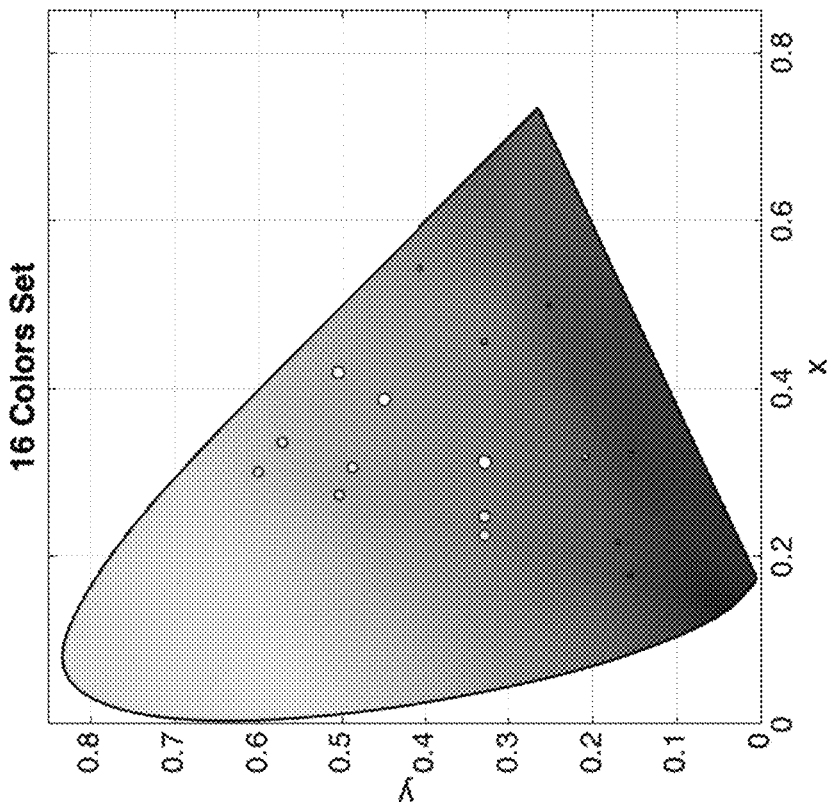
FIG. 5A shows an example of a 16 colors output mapping table in RGB color space according to one embodiment.
FIG. 5B shows an example of a 16 colors set in RGB color space according to one embodiment.

FIG. 5A shows an example of a 16 colors output mapping table in RGB color space according to one embodiment. Referring to FIG. 5A, a 16-color color set in RGB color space is selected to map to identifier (ID) values 0-15. The identifier values may represent a 4-bit length payload. For example, RGB value of (0, 128, 255) corresponds to 4-bit word of value 0 or '0000'. RGB value of (128, 128, 255) corresponds to a 4-bit word of value 4 or '0100'. The color output mapping table is predefined so that generator 117 of FIG. 1B can generate images based on the color output mapping table. When a spot measurement device or a visual inspection by a user detects a screen display having a measurement output, the user and/or spot measurement device can refer to a color mapping table, such as color mapping table of FIG. 5A to determine a corresponding 4-bit output payload value. Furthermore, a spot measurement device may be calibrated for all the measurement colors in a measurement color set for a display device prior to detecting and decoding a measurement color.

FIG. 5B shows an example 16 colors set in RGB color space according to one embodiment. Referring to the RGB color space, 16 colors are selected for a 4-bit payload value. The 16 colors are predetermined or selected to be spaced approximately equally distances apart so a measurement algorithm or a spot measurement device can verify and/or detect an output payload of a display device with high accuracy. Further, a color spectrum with high luminance may be preferred in one embodiment over a color spectrum with low luminance for measurement color selections. It is known in the art that a color measurement device measuring a color with high luminance will have a reduced measurement time in comparison with a color with low luminance. In some embodiments, a different number of colors are selection for different output bit, e.g., 32 colors may be selected for a 5-bit payload value. In another embodiment, on order to increase robustness, a display device may display one or more measurement patch or output images for a calibration software to determine how well the display device can render minor color differences. Based on the calibration results, the display device may switch to a higher bit payload value (e.g., from a 4-bit to a 5-bit payload) to increase transfer bandwidth.

Figure 6:
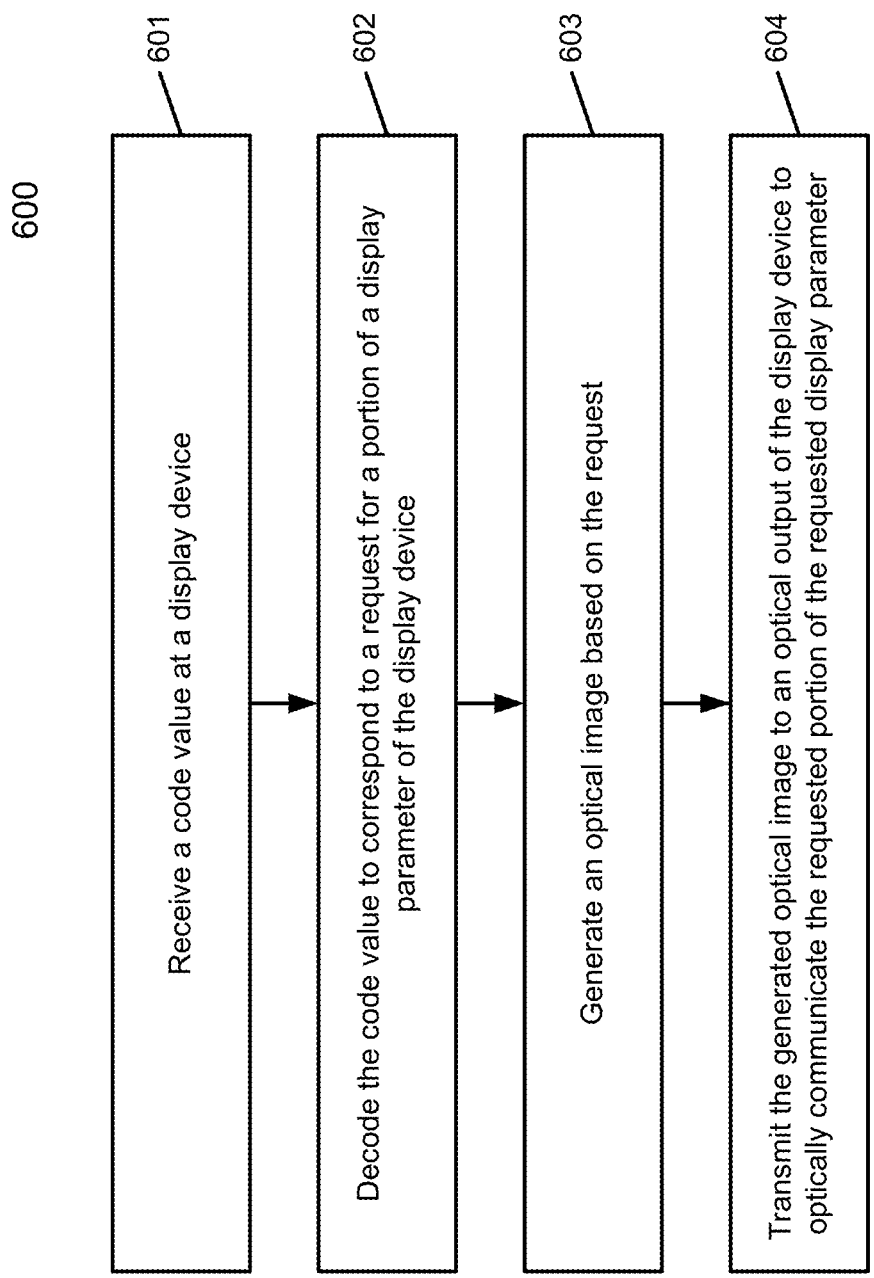
FIG. 6 is a flowchart that shows a method according to one or more embodiments.

FIG. 6 is a flowchart that shows a method according to one or more embodiments, and this method can be performed by a display device such as that shown in FIG. 1A or FIG. 1B. Method or process 600 may be performed by processing logic which may include software, hardware, or a combination thereof. For example, process 600 may be performed by a generator 117 of FIG. 1B. Referring to FIG. 6, at block 601, processing logic receives a code value at a display device. At block 602, processing logic decodes the code value to correspond to a request for a portion of data about the display device such as a display parameter of the display device. At block 603, processing logic generates an optical image based on the request. At block 604, processing logic transmits the generated optical image to an output of the display device to communicate the requested portion of the display parameter. In one embodiment, the display device includes a security module that prevents unauthorized access to and from the display device. In another embodiment, a code value is received as a metadata embedded in image data. In another embodiment, transmitting the generated optical image to an output includes displaying the generated optical image on a display screen of the display device. In another embodiment, the display device includes a display management system that tone maps and color volume maps an input image into an output image on the display device.

In one embodiment, the generated optical image includes one of a number of colors, such that a color is decoded by a color lookup table. In another embodiment, the measure colors are predetermined from a color spectrum having high luminance such that the measurement colors can be automatically measured by an image capturing device or a measurement system with a reduced measurement time. In another embodiment, the measurement colors are predetermined to be spaced approximately equally apart so a measurement algorithm of an image capturing device or a measurement system can distinguish measurement output payload colors.

In one embodiment, a generated optical image consists of a single color image representing a parameter of the display device. In another embodiment, a generated optical image is divided into two or more regions; each region consists of a single color image representing one or more parameters of the display device. In another embodiment, the color lookup table includes a number of colors such that a first and a second colors of the number of colors are represented by a first and a second bit lengths respectively and the first bit length is different from the second bit length. In another embodiment, colors are decoded by two or more color lookup tables. For example, a first color can be found from a first color lookup table representing a 4-bit code value while a second color can be found from a second color lookup table representing a 5-bit code value.

In one embodiment, a generated output image includes a spatial pattern to represent one or more parameters of the display device. In another embodiment, the display device includes an image capturing module to capture a spatial pattern such that one or more parameters of the display device can be interpreted.

In one embodiment, the display device displays all measurement colors of a color lookup table on a display screen of the display device so all measurement colors of a color lookup table can be presented to a measurement system and the measurement system can be calibrated for the display device. In another embodiment, a subsequent request for some display parameters of the display device is generated based on output optical images. In another embodiment, the subsequent request is for a different display parameter than the display parameter of the previous request.

In one embodiment, the optical output port of the display device comprises a high definition multimedia interface (HDMI) output port. In one embedment, the generated optical image includes a checksum value for error checking. In one embodiment, the optical image transmitted by the display device corresponds to a first data type supported by the display device. In another embodiment, the optical image transmitted by the display device along with one or more subsequently transmitted optical images correspond to a second data type supported by the display device with a larger bit length than the bit length of bit representations of the transmitted optical image so that bit representations of the transmitted optical images can be concatenated in a sequence to represent the second supported data type.

Figure 7:
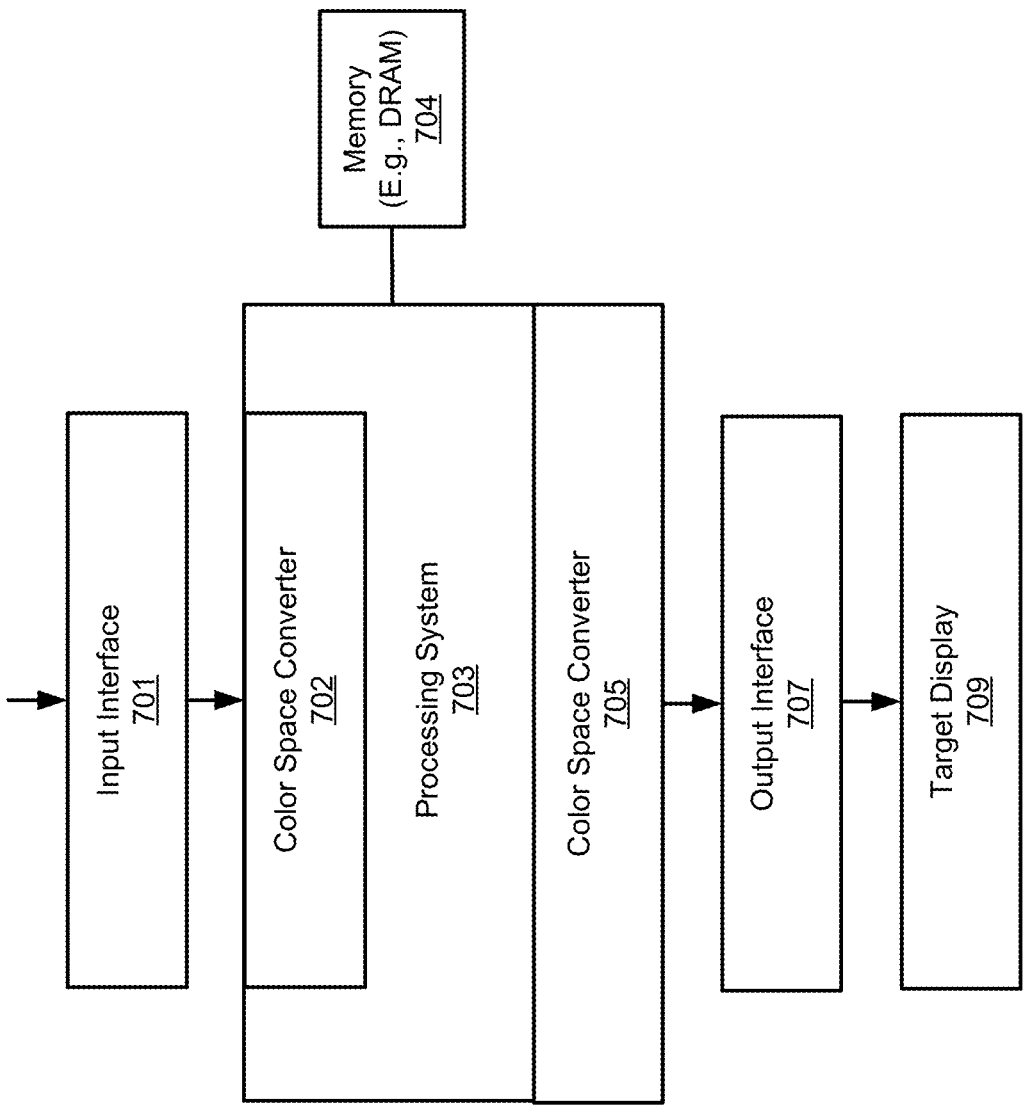
FIG. 7 shows an example of a display management system according to one or more embodiments described herein.

FIG. 7 shows an example of components of a display management system, such as the display management system shown in FIG. 1B. This example in FIG. 7 typically includes hardware processing systems, such as either general purpose processor(s) or some special purpose processor(s) or both, and memory and input and output interfaces. The general purpose processor(s), if present, can be programmable by software instructions which execute on the one or more general purpose processors. The special purpose processors, if present, may also be configured by software or hardware logic to perform operations, such as color space conversions or other processing operations. The input interface 601 can be a network interface, such as an Ethernet or WiFi interface or a cable TV interface or a satellite TV interface, and the input interface 701 receives, in one embodiment, the input image represented by image data 115 and/or a metadata represented by metadata 113 shown in FIG. 1B. This input can then be provided to the color space converter 702, which in one embodiment can be the color space converter 105 of FIG. 1B. The color space converter 702 can be implemented in either general purpose programmable hardware or special purpose hardware configured to perform color space conversions (or a combination of both) and contained within the processing system 703, which is coupled to memory 704. The memory 704 can store images and metadata, such as metadata 113. The processing system 703 can perform, in one embodiment, the tone mapping operations and the color volume mapping operations, such as operations performed by mapper 107 of FIG. 1B and can also include optical communication image generator 117. The color space converter 705 can then convert the mapped image data into an output color space to drive the target display 709 through an output interface 707. The output interface 707 can be a hardware interface, such as an HDMI interface or other known display interfaces which are coupled to the target display 709, which can be the same as the output 114 shown in FIG. 1B.

Figure 8:
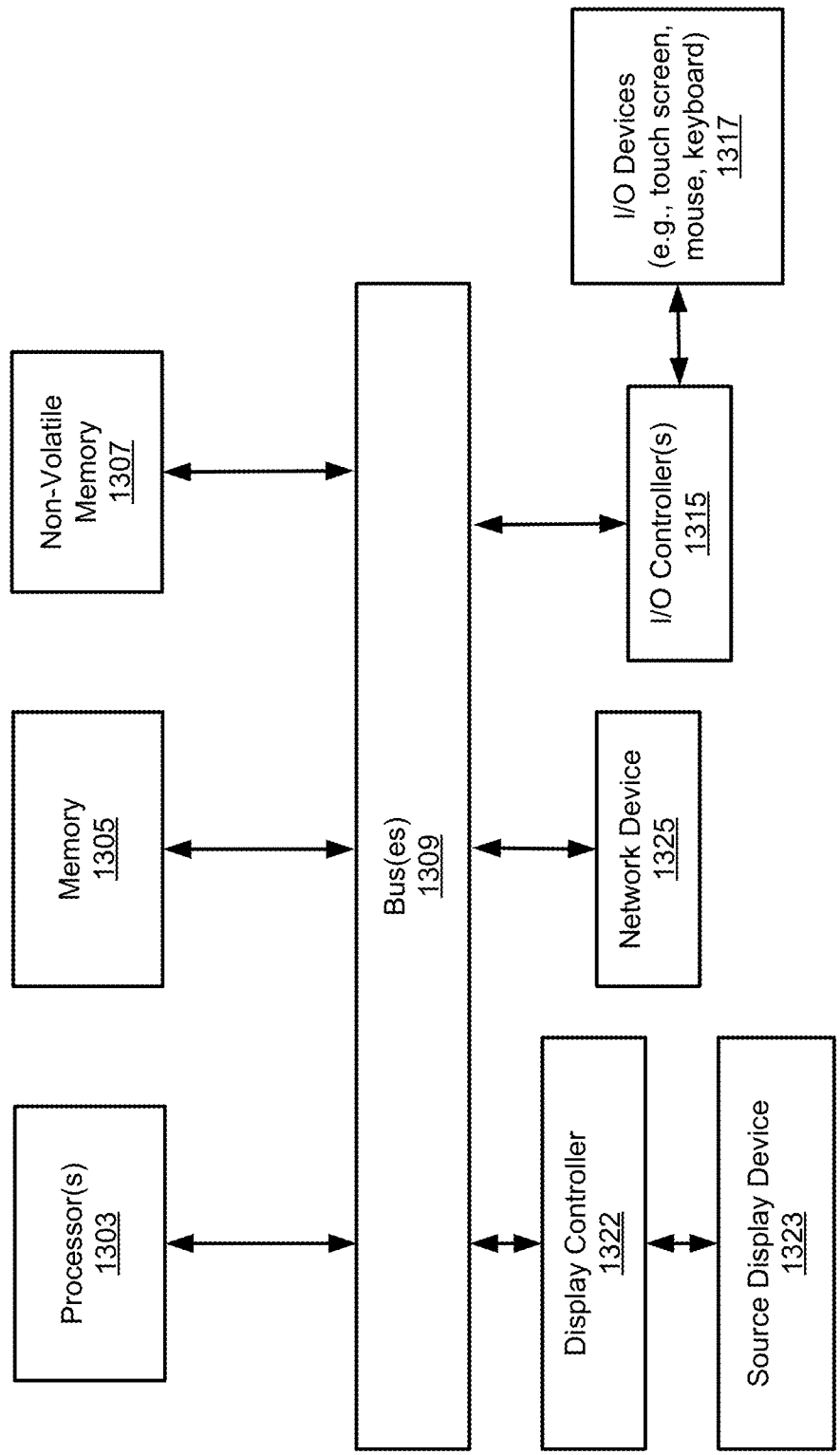
FIG. 8 shows an example of a data processing system.

FIG. 8 shows an example of a data processing system that can be used as a part of a display device. The systems and methods described herein can be implemented in a variety of different data processing systems and devices, including general-purpose computer systems, special purpose computer systems, or a hybrid of general purpose and special purpose computer systems.

FIG. 8 is a block diagram of data processing system hardware according to an embodiment. Note that while FIG. 8 illustrates the various components of a data processing system, it is not intended to represent any particular architecture or manner of interconnecting the components as such details are not germane to the present invention. It will also be appreciated that other types of data processing systems that have fewer components than shown or more components than shown in FIG. 8 can also be used with one or more embodiments of the present invention.

As shown in FIG. 8, the data processing system includes one or more buses 1309 that serve to interconnect the various components of the system. One or more processors 1303 are coupled to the one or more buses 1309 as is known in the art. Memory 1305 may be DRAM or non-volatile RAM or may be flash memory or other types of memory or a combination of such memory devices. This memory is coupled to the one or more buses 1309 using techniques known in the art. The data processing system can also include non-volatile memory 1307, which may be a hard disk drive or a flash memory or a magnetic optical drive or magnetic memory or an optical drive or other types of memory systems that maintain data even after power is removed from the system. The non-volatile memory 1307 and the memory 1305 are both coupled to the one or more buses 1309 using known interfaces and connection techniques. A display controller 1322 is coupled to the one or more buses 1309 in order to receive display data to be displayed on a source display device 1323. The source display device 1323 can include an integrated touch input to provide a touch screen. The data processing system can also include one or more input/output (I/O) controllers 1315 which provide interfaces for one or more I/O devices, such as one or more mice, touch screens, touch pads, joysticks, and other input devices including those known in the art and output devices (e.g. speakers). The input/output devices 1317 are coupled through one or more I/O controllers 1315 as is known in the art.

While FIG. 8 shows that the non-volatile memory 1307 and the memory 1305 are coupled to the one or more buses 1309 directly rather than through a network interface, it will be appreciated that the present invention can utilize non-volatile memory that is remote from the system, such as a network storage device which is coupled to the data processing system through a network interface such as a modem or Ethernet interface. The buses 1309 can be connected to each other through various bridges, controllers and/or adapters as is well known in the art. In one embodiment the I/O controller 1315 includes one or more of a USB (Universal Serial Bus) adapter for controlling USB peripherals, an IEEE 1394 controller for IEEE 1394 compliant peripherals, or a Thunderbolt controller for controlling Thunderbolt peripherals. In one embodiment, one or more network device(s) 1325 can be coupled to the bus(es) 1309. The network device(s) 1325 can be wired network devices (e.g., Ethernet) or wireless network devices (e.g., WiFi, Bluetooth) that receive images from a camera, etc.

It will be apparent from this description that one or more embodiments of the present invention may be embodied, at least in part, in software. That is, the techniques may be carried out in a data processing system in response to its one or more processor(s) executing a sequence of instructions contained in a storage medium, such as a non-transitory machine-readable storage medium (e.g. DRAM or flash memory). In various embodiments, hardwired circuitry may be used in combination with software instructions to implement the present invention. Thus the techniques are not limited to any specific combination of hardware circuitry and software, or to any particular source for the instructions executed by the data processing system.

In the foregoing specification, the invention has been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method for optically communicating display parameters of a display device, the method comprising:

operating a display device in a first mode in which images are received through an image input path and displayed on the display device;

receiving a code value through the image input path of the display device, the display device including a firewall that prevents access to data from the display device;

decoding the code value to correspond to a request for a display parameter of the display device;

generating an optical image based on the requested display parameter, wherein the display parameter provides information about one or more parameters of a hardware or software component of the display device, and the information is communicated in the generated optical image;

switching to a second mode of operating the display device in response to receiving the code value, the generated optical image selected as output to the display device in the second mode;

transmitting the generated optical image to an output of the display device to communicate the requested display parameter; and wherein transmitting the generated optical image to an output comprises displaying the generated optical image on a display screen of the display device, and wherein the display device includes a display management system that tone maps and color volume maps an input image into an output image on the display device; and wherein the display management system includes the firewall that blocks attempts to access at least some data within the display device.

2. The method of claim 1, wherein the code value is received as a metadata embedded in input image data and wherein the generated optical image is captured by a camera of a mobile device used by a user that operates the display device.

3. The method of claim 1, wherein the generated optical image comprises a plurality of measurement colors that are predetermined from a color spectrum having high luminance such that the plurality of measurement colors can be automatically measured by an image capturing device or a measurement system with reduced measurement time.

4. The method of claim 1, wherein the generated optical image comprises a plurality of measurement colors that are predetermined to be spaced approximately equally apart so a measurement algorithm of an image capturing device or a measurement system can distinguish measurement output payload colors.

5. The method of claim 1, wherein the generated optical image is divided into two or more regions, each region consists of a single color image representing two or more portions of data.

6. The method of claim 1, wherein the generated optical image comprises at least one measurement color in a color lookup table that comprises a plurality of colors, wherein a first color and a second color of the plurality of colors are represented by code values of a first and a second bit lengths respectively, wherein the first bit length is different from the second bit length.

7. The method of claim 1, further comprising:
receiving a second code value at the display device through the image input path;
decoding the second code value to correspond to a request for a second portion of the display parameter of the display device;
generating a second optical image based on the second portion of the display parameter; and
transmitting the second optical image to an optical output of the display device to optically communicate the second portion of the display parameter such that the display parameter can be retrieved based on a first and a second optical images.

8. The method of claim 1, wherein the generated optical image comprises a spatial pattern to represent a display parameter of the display device.

9. The method of claim 8, further comprising an image capturing device to capture a spatial pattern such that the display parameter of the display device can be determined.

10. The method of claim 1, further comprising displaying on a display screen of the display device all measurement colors of a color lookup table so that all the colors associated with individual code values of the color lookup table are presented to a measurement system.

11. The method of claim 1, further comprising generating a subsequent request for a second display parameter of the display device based on the output optical image.

12. The method of claim 1, further comprising transmitting an optical image to acknowledge a most recent settings change upon receiving a reserved code value.

13. The method of claim 1, further comprising transmitting an optical image to report a most recent settings change upon receiving a reserved code value.

14. The method of claim 1, further comprising generating an optical image to include a checksum for error checking.

15. The method of claim 1, wherein the optical image transmitted by the display device corresponds to a first data type supported by the display device.

16. The method of claim 1, wherein the optical image transmitted by the display device along with one or more subsequently transmitted optical images correspond to a second data type supported by the display device that has a higher bit length than the bit length corresponding to an optical image so that bit representations of the transmitted optical images can be concatenated in sequence to represent the second supported data type.

17. A non-transitory machine readable medium storing instructions which when executed by a data processing system cause the system to perform a method, the method comprising:
operating a display device in a first mode in which images are received through an image input path and displayed on the display device;
receiving a code value through the image input path of the display device, the display device including a firewall that prevents access to data from the display device;
decoding the code value to correspond to a request for a display parameter of the display device;
generating an optical image based on the requested display parameter, wherein the display parameter provides information about one or more parameters of a hardware or software component of the display device, and the information is communicated in the generated optical image;
switching to a second mode of operating the display device in response to receiving the code value, the generated optical image selected as output to the display device in the second mode;
transmitting the generated optical image to an output of the display device to communicate the requested display parameter; and
wherein transmitting the generated optical image to an output comprises displaying the generated optical image on a display screen of the display device, and wherein the display device includes a display management system that tone maps and color volume maps an input image into an output image on the display device; and wherein the display management system includes the firewall that blocks attempts to access at least some data within the display device.

18. A data processing system which includes a memory and a processor configured to perform a method as in claim 1.

19. The method of claim 1 wherein the display parameter provides information about the display management system that tone maps and color volume maps an input image into an output image on the display device.

20. The method of claim 19, wherein the method further comprises:
selecting the generated optical image as the output of the display device instead of an image containing colors.

* * * * *